Jan. 21, 1936.  R. L. CARR  2,028,143
VEHICLE BODY
Filed May 11, 1933  7 Sheets-Sheet 1
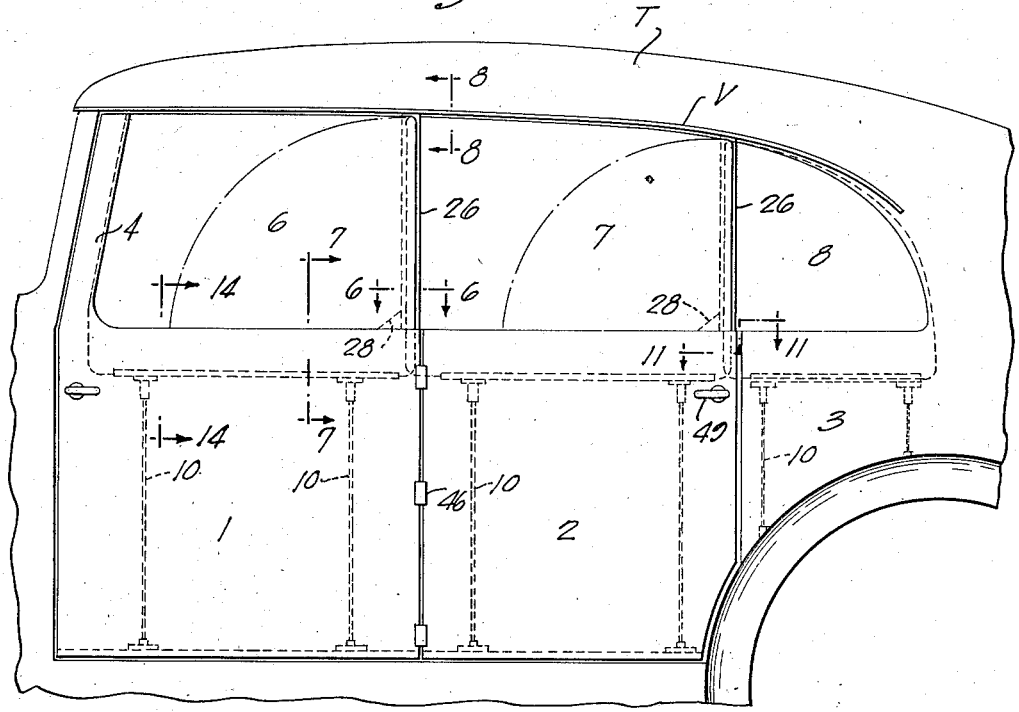
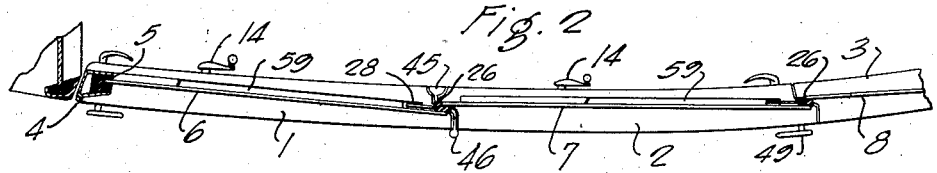
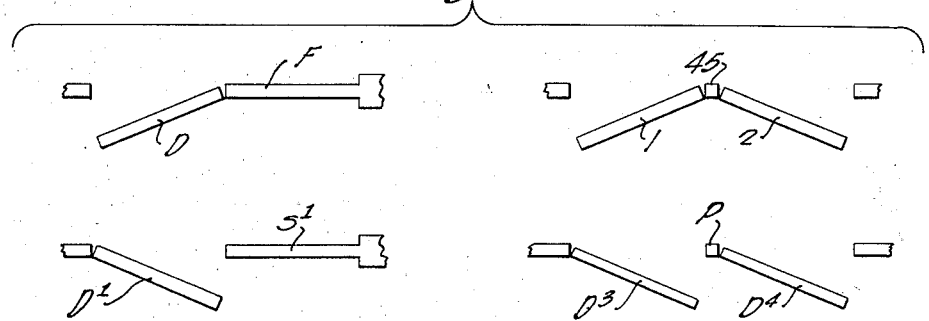
Inventor
Raymond L. Carr Jan. 21, 1936.    R. L. CARR    2,028,143
VEHICLE BODY
Filed May 11, 1933    7 Sheets-Sheet 2
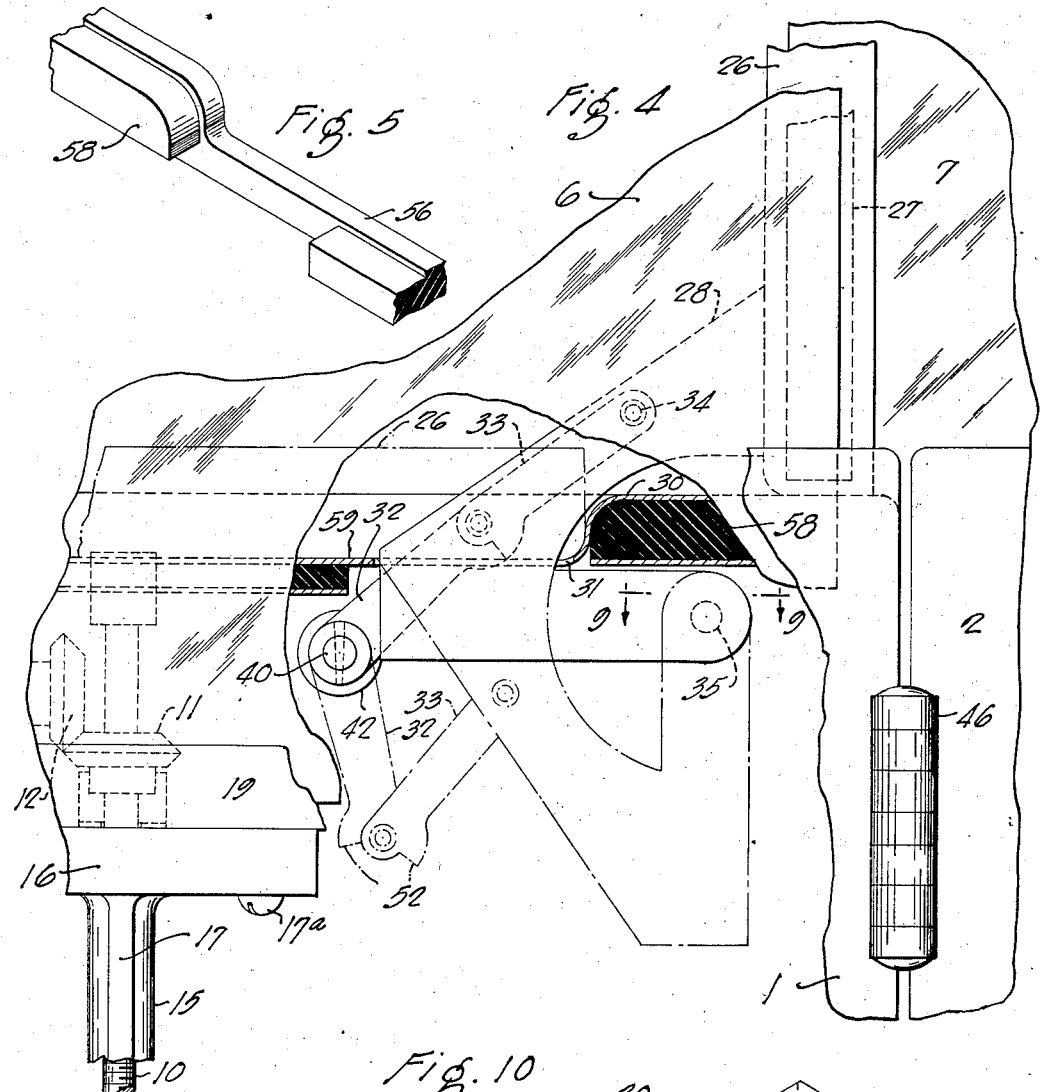
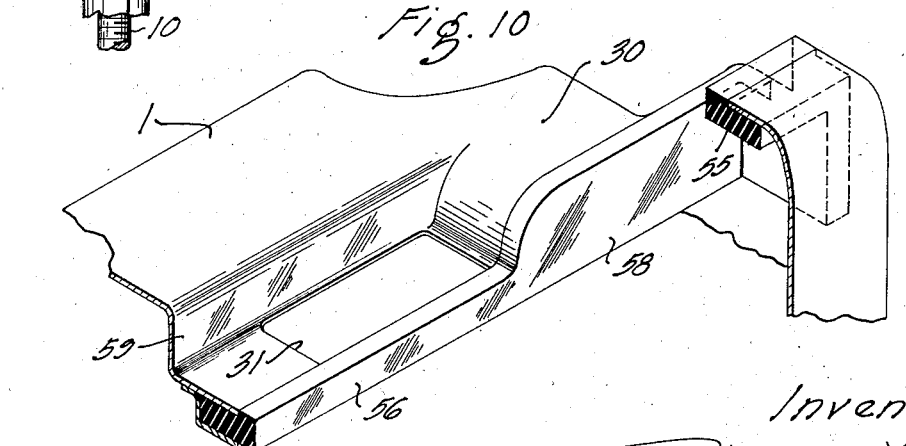
Inventor
Raymond L. Carr

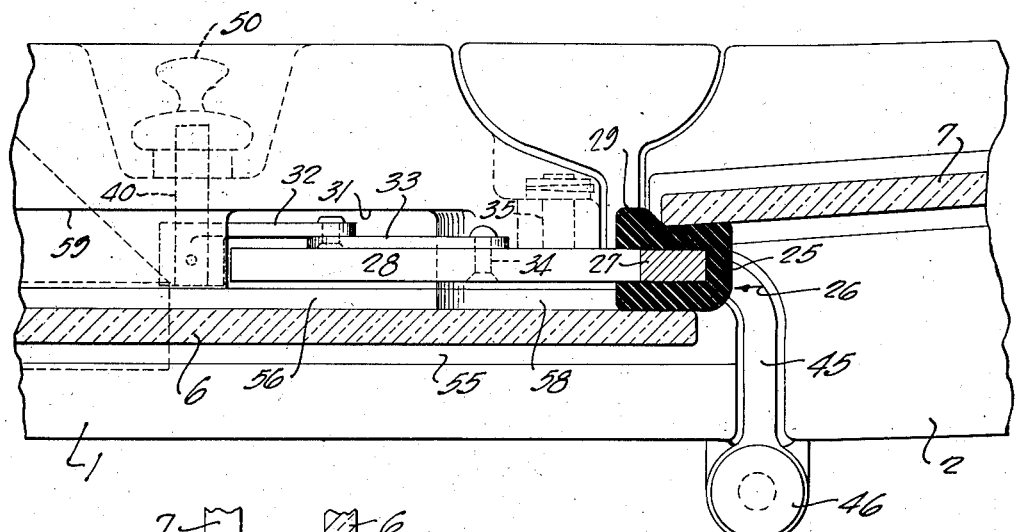
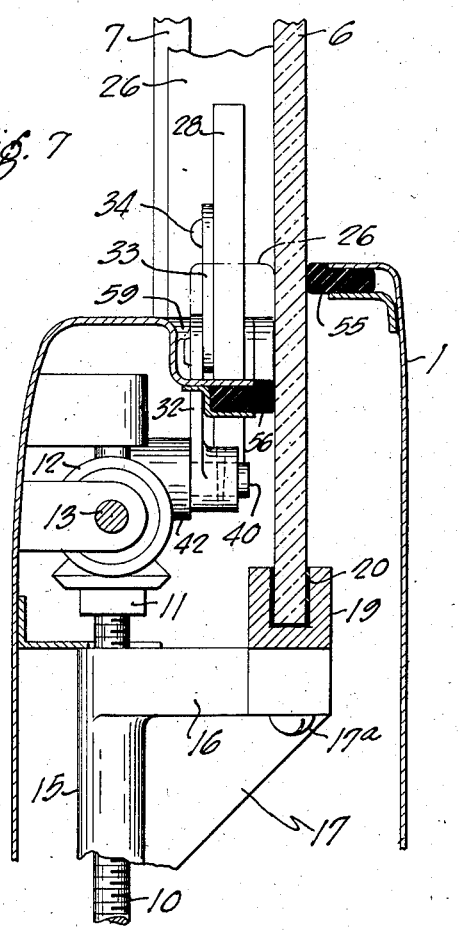
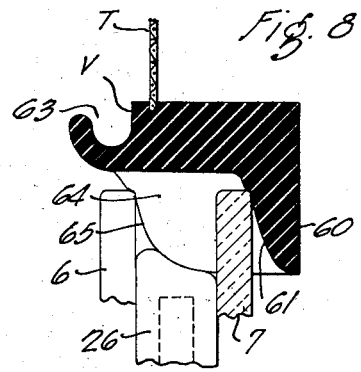
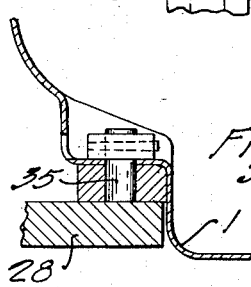

Jan. 21, 1936.                R. L. CARR                 2,028,143
                              VEHICLE BODY
                          Filed May 11, 1933          7 Sheets-Sheet 4
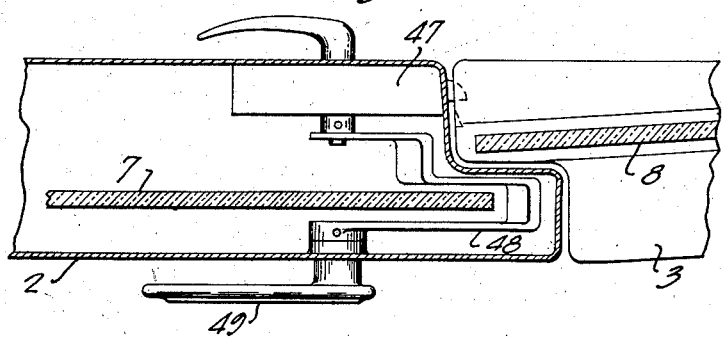
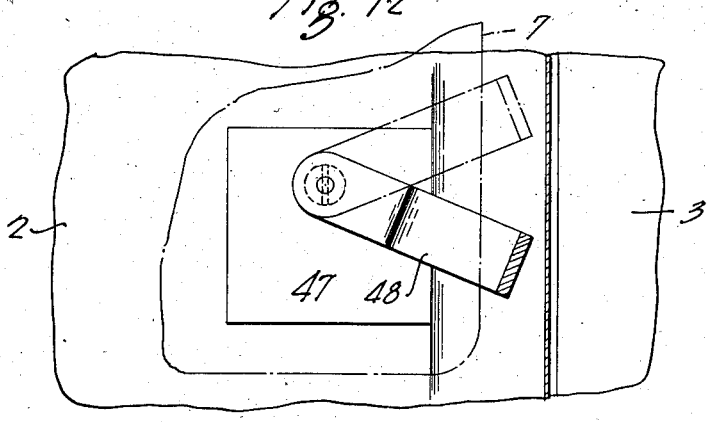
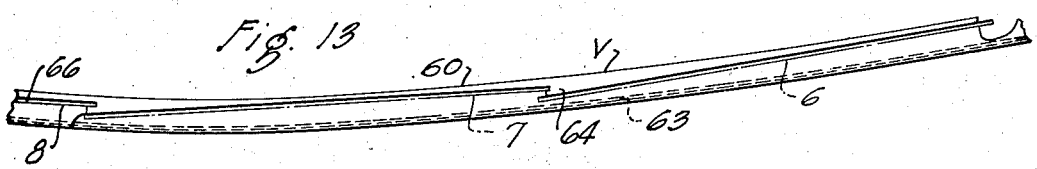
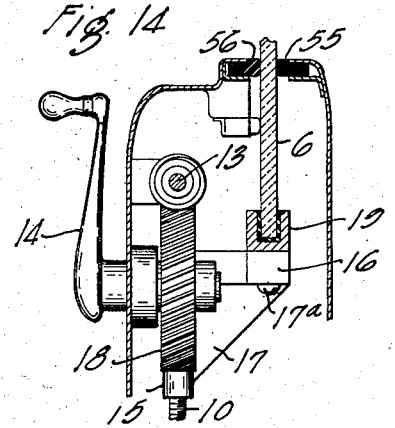
Inventor
Raymond L. Carr Jan. 21, 1936.  R. L. CARR  2,028,143
VEHICLE BODY
Filed May 11, 1933   7 Sheets-Sheet 5
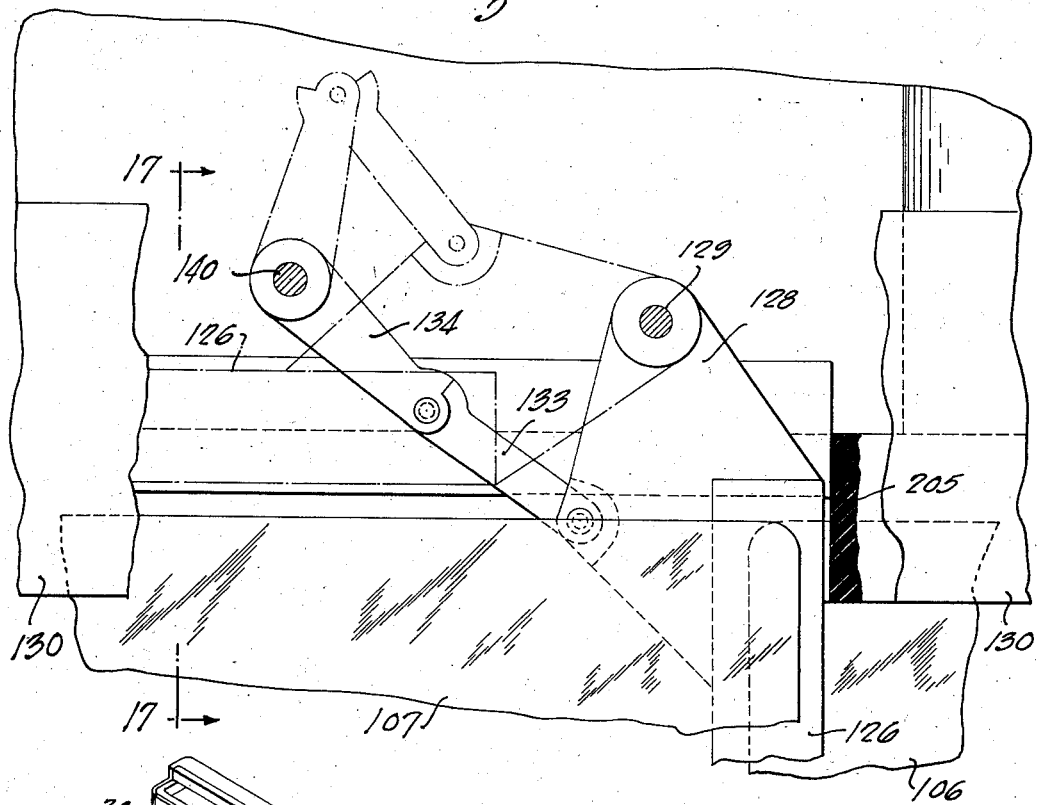
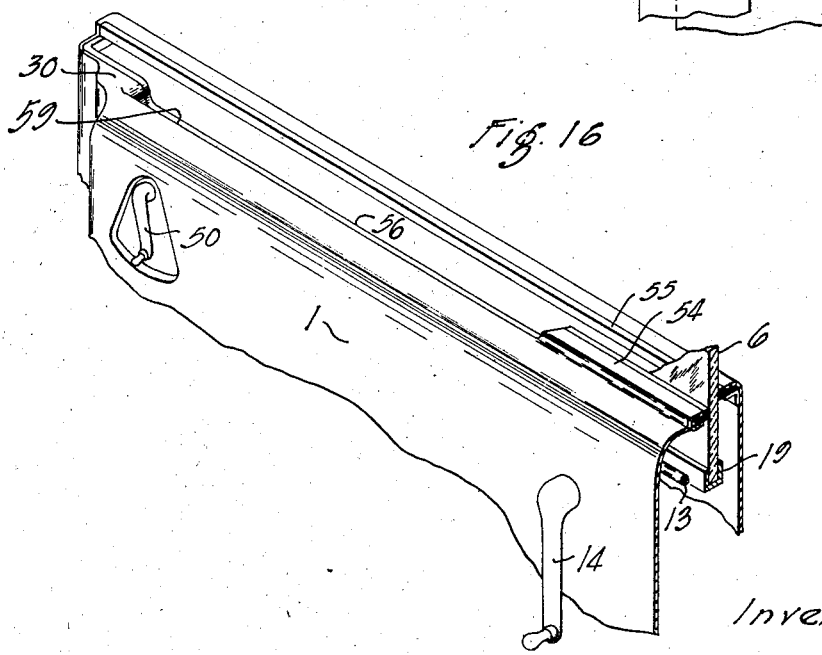
Inventor
Raymond F. Carr Jan. 21, 1936.  R. L. CARR  2,028,143
VEHICLE BODY
Filed May 11, 1933   7 Sheets-Sheet 6
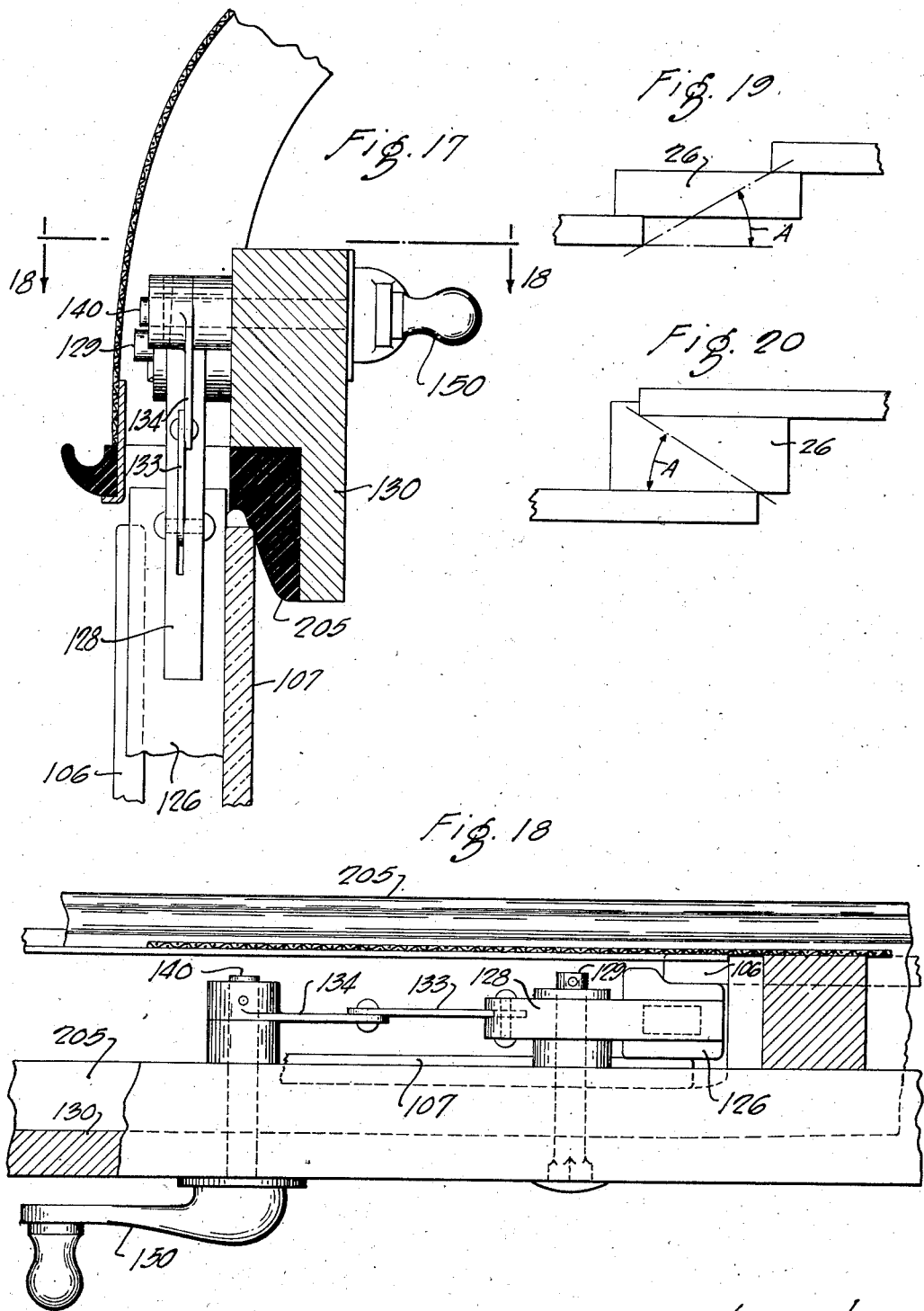
Inventor
Raymond L. Carr

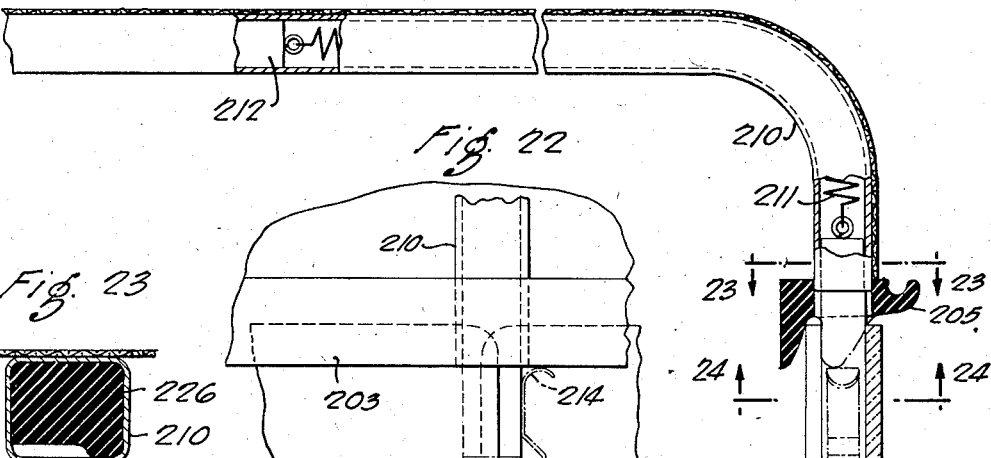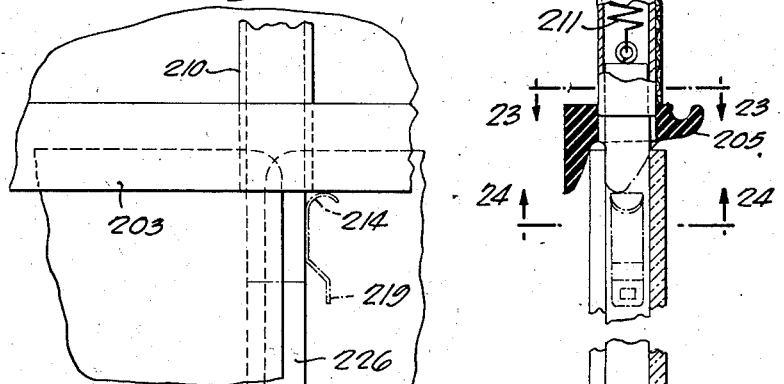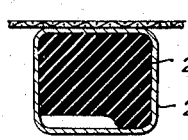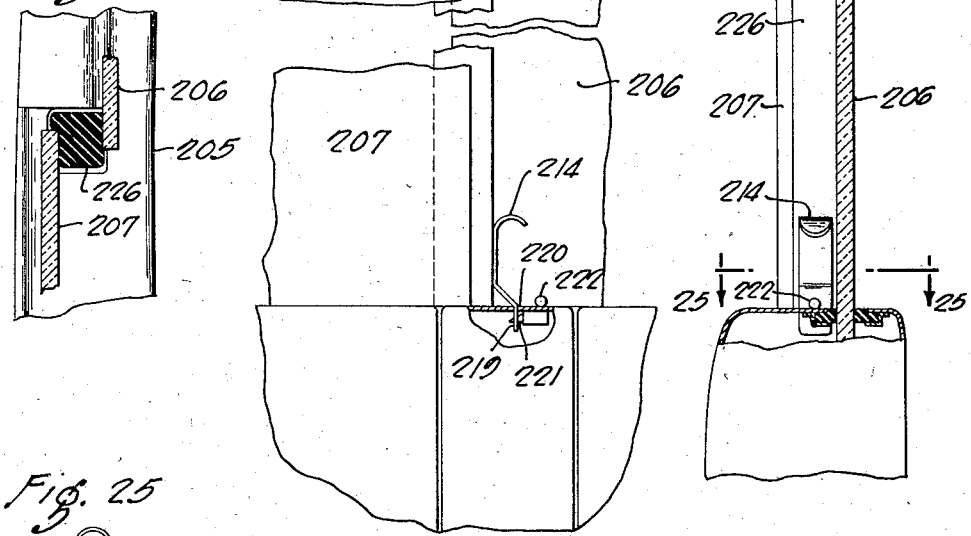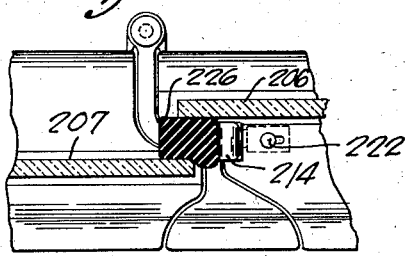

Patented Jan. 21, 1936

2,028,143

UNITED STATES PATENT OFFICE 2,028,143

VEHICLE BODY

Raymond L. Carr, Boston, Mass.

Application May 11, 1933, Serial No. 670,488

21 Claims. (Cl. 296—45)

This invention relates to an improved vehicle body, and particularly an arrangement of closure panels and members. My prior Patents Nos. 1,826,865 and 1,826,922 disclose arrangements for moving closure panels so that they may provide a continuous transparent closure wall above a body wall. My copending application Serial No. 371,162, filed June 15, 1929, dicloses a generally similar arrangement. Body constructions of the type illustrated in my prior above-identified patents involve rather costly mechanism for moving and properly positioning the panels to afford a continuous transparent wall and to permit easy manipulation of the panels by the user. On the other hand, the above-identified application illustrates a somewhat more simple construction which affords the same advantages to the user, but involves the necessity of relatively deep slots at the ends of the body wall sections to permit the panels to remain in contact. Slots of this character are objectionable structurally since they tend to weaken the body wall and necessitate special bracing arrangements to afford a satisfactory construction.

The present invention is particularly effective in avoiding the disadvantages of these arrangements while approximating their advantages. The chief advantages of the prior constructions were the provision of the continuous transparent wall to afford clear vision and impart a longer, more sweeping appearance to the vehicle and the avoidance of the necessity of inserting or removing or otherwise manipulating a post between closure members or moving sectional panels or the like. Accordingly these inventions each provided closure wall arrangements permitting clear vision and attractive appearance as well as allowing simplicity and facility of operation.

The present invention affords an arrangement which has greater structural simplicity and sturdiness and which, under most conditions of use, affords the advantages which particularly characterize the inventions referred to. To this end, the present invention affords closure panels which are laterally tilted in relation to each other. Thus in a simple embodiment of the invention there may be two closure panels, one behind the other on adjoining sections of the body wall, with the front panel inclined laterally in relation to the rear panel so that the rear free edge of the former is spaced outwardly in a lateral direction from the front free edge of the latter. Thus the edges of the panels are in effect arranged in spaced, substantially overlapped relation. An arrangement of this character permits each of the panels to have a width of the order of the width of the corresponding door or wall section and to follow a continuous, straight or rectilinear path, and permits the panels to be firmly mounted on the respective sections. Furthermore, the laterally tilted arrangement of the front or immediate panels affords a very substantial degree of weather protection, especially when the vehicle is in motion. Except under very adverse conditions, an appreciable amount of rain or snow does not enter the vehicle through the space thus provided between the panels. On the other hand, if ventilating means or air inlets are provided around the front of the enclosed portion of the body as, for example, conventional cowl ventilators or ventilating arrangements associated with the hood, and/or radiator, as disclosed in my copending application Serial No. 1,967, filed January 15, 1935, an appreciable degree of ventilation may be afforded, even in inclement weather, without exposure to rain. An emergency filler strip may be provided, however, for movement into the space between the panel edges when extreme weather conditions are encountered.

It is thus evident that under usual operating conditions an extremely simple closure structure is afforded permitting the lifting and lowering of panels in the conventional manner and permitting a simple supporting arrangement therefor, and further, that the raised panels afford a certain degree of ventilation, particularly when employed in conjunction with air inlets at the front of the vehicle body, while a fully weather-tight wall may be readily afforded by movement of the filler strip or strips if unusually severe conditions are encountered.

In accordance with this invention, the filler strips may be arranged in various manners. Such strips may be pivotally mounted on the tops of the doors or body wall sections and may swing from horizontal positions to vertical positions between the panel edges at the ends of the doors, or the strips may swing downwardly from substantially horizontal positions adjoining the top rail to vertical positions between the panels or, if desired, flexible strips may be drawn down between the panel edges after the general manner disclosed in my prior application Serial No. 370,393 now Patent No. 1,909,167.

A particularly advantageous arrangement of the filler strip involves its pivotal mounting on the body wall section so that it may be conveniently swung upwardly and locked in position when desired. For this purpose a handle and simple control mechanism such as a toggle arrangement may be provided. The paths of the panels preferably are so defined and the shape of the filler strip preferably is so determined that the latter may move into a wedging engagement between the panels, thus to assure a weather-tight, rattle-free structure. Accordingly the filler strip may conveniently be formed of or include yieldable material such as rubber.

The arrangement of the panels and filler strips is such that they may be employed in conjunction with a wide variety of door and fixed body wall sections arranged in various ways to suit the requirements of the individual body designer. Thus this invention is applicable to bodies having two juxtaposed swinging doors with one of the doors hinged at the end adjoining the other door and with the latter hinged at either of its ends, or the arrangement may be employed in conjunction with one or more doors and one or more fixed body wall sections.

A further aspect of the invention relates to the novel arrangement of valance structure which cooperates with laterally tilted panels mounted in accordance with this invention.

In the accompanying drawings:

Fig. 1 is a side elevation of a portion of a vehicle body in which the principles of my invention are incorporated;

Fig. 2 is a plan view of the wall of the body, being somewhat schematic in character;

Fig. 3 is a schematic view showing various arrangements of swinging doors and fixed sections, which may be used with the principles of the present invention;

Fig. 4 is a side elevation, with parts removed and shown in section, of a portion of the body wall and closure members;

Fig. 5 is an isometric detail of the end of a cushioning element employed in the body wall;

Figs. 6, 7, and 8 are sections on lines 6—6, 7—7, and 8—8, respectively, of Fig. 1;

Fig. 9 is a sectional detail indicated by line 9—9 of Fig. 4;

Fig. 10 is a broken isometric view of the end of the inner door rail;

Fig. 11 is a section on line 11—11 of Fig. 1;

Fig. 12 is a longitudinal section of a portion of the body wall, showing a part of the assembly illustrated in Fig. 11;

Fig. 13 is a bottom view of the valance, the position of the panels being indicated in dot and dash lines;

Fig. 14 is a section on line 14—14 of Fig. 1;

Fig. 15 is a side elevation, with parts broken away, illustrating an optional development of the invention;

Fig. 16 is an isometric view of the rear part of the door;

Fig. 17 is a section indicated by line 17—17 of Fig. 15;

Fig. 18 is a section indicated by line 18—18 of Fig. 17;

Figs. 19 and 20 diagrammatically illustrate optional arrangements of panel edges and filler strips.

Fig. 21 is a broken sectional view of a body wall, closure wall, and top in which an optional embodiment of the invention is employed;

Fig. 22 is a broken side elevation of a portion of the assembly shown in Fig. 21; and Figs. 23, 24, and 25 are sections on lines 23—23, 24—24, and 25—25, respectively, of Fig. 21.

For convenience of description and to facilitate an understanding of this invention, reference may first be made to Figs. 1 and 4. In accordance with this invention a body wall may comprise a plurality of sections such as the doors 1 and 2, and the fixed rear section 3. The front of the door 1 may be provided with a post 4 having a channel 5 to receive the front edge of the closure panel 6; this channel may extend downwardly into the door pocket, if desired. The rear door 2 may carry a closure panel 7, while a panel 8 may be similarly mounted on the rear section 3.

Suitable lifting and guiding means may be provided for the windows in order to permit their movement out of a substantially concealed position within the body wall to a raised position thereabove. Such lifting and guiding means may be of any suitable type, being arranged, however, so that longitudinal tilting of the panel is avoided. For this purpose vertical worms 10 may be driven through beveled gears 11, meshing with similar gears 12 upon a horizontal shaft 13 (see Figs. 1 and 7), the latter being driven by a hand crank 14 through any suitable gearing such as the spiral gears 18 (Fig. 14). Brackets 17 are provided with internally threaded cylindrical portions 15 which move upwardly and downwardly on the worms 10. These brackets may also be provided with outstanding platform portions 16 which are secured, as by fastenings 17ª to the channel frame 19 of the corresponding panel.

Between the glass body portion of the panel and the frame 19, a thin layer of cushioning material 20 may be provided, it being understood that the panel, however, is substantially rigidly mounted so that it has no substantial lateral movement but moves as a fixed unit with the brackets 14. The channel 19 preferably is relatively heavy and rigid so that an assembly is provided extending between the worms effectively to oppose any tendency of the brackets 17 to turn with the worms. The front and rear edges of the panels as well as the upper edges thereof may be unframed, as shown, or may be provided with light channeled frames over part or all of their perimetric portions, if desired. I prefer, however, to have the ends of the panels transparent.

In accordance with this invention, the successive panels are arranged so that the front panel has its rear edge spaced outwardly in a lateral direction from the juxtaposed front edge of the next panel. If three panels are employed, as illustrated in Figs. 1 and 2, the intermediate panel 7 may have its front edge thus spaced inwardly from the rear edge of the front panel 6, while its rear edge is spaced outwardly from the front edge of rear panel 8. If the panels are fully raised under normal operating conditions, substantial weather protection is afforded, even if the spaces between the panel edges are not filled. The normal forward motion of the vehicle is effective in causing the movement of air and rain or snow past the front edges of the panels which are thus in spaced overlapped relation to the edges of adjoining panels. Accordingly, under most conditions, occupants of a body of this character need merely to operate the lifter handles to adjust the panels at the positions desired and, even under inclement conditions, will only have to raise the panels to their uppermost positions. Under such conditions suitable ventilators in the front portion of the body, such as conventional cowl ventilators or ventilating arrangements associated with the hood, such as disclosed in my above-identified copending application Serial No. 1,967, may be employed to permit the entrance of air to the vehicle, the spaces between the panel edges allowing the outflow of this air and thus permitting ventilation while affording weather protection.

In order to permit the closing of the spaces between adjoining panels, various arrangements of filler members or strips may be employed so that the occasional manipulation of these members may be readily effected. Preferably, as shown in Figs. 1 to 7, inclusive, I employ a filler member or strip 26 which swings out of the position wherein it is disposed in or upon the body wall to a position wherein it occupies the space between adjoining panels. Such a filler strip 26 preferably is provided with a yieldable surface and has an edge portion of somewhat reduced cross section so that it may be pushed or swung between the panels with a firm wedge-like engagement, thus assuring a weather-tight closure and avoiding any possibility of rattling. Such a strip may include a metal bar or core member 27 and a rubber jacket 25 which, in this embodiment of the invention, may be provided with a rib 29 (Fig. 6) adapted to lie in front of the front edge of the adjoining panel as, for example, the panel 7.

Secured to or forming an extension of the core member 27 is a swinging bracket 28 which is mounted on a pivot pin 35 disposed within the upper corner of the body wall section such as the door 1. The bracket 28 preferably is of generally triangular form but has a cut-out portion with an edge that may substantially define an arc drawn about the center of pin 35. Thus, as shown particularly in the full and dotted line positions of Fig. 4, the bracket 28 may swing about a portion 30 of the door rail, moving through a slot 31 which is disposed forwardly of this portion at the bottom of a rabbet or recess 59 in the door rail which extends forwardly to receive the filler member 26 when the latter is in its horizontal lowered position.

Preferably the bracket 28 is associated with suitable lifting and locking mechanism. For this purpose, I preferably employ a pair of toggle links 32 and 33, the latter being pivoted, as designated by numeral 34, to the bracket 28 and the former being pivotally mounted on the upper part of the door. For this purpose a pin or rod 40 extends through a fixed bearing member 42 on the inner part of the door and is connected to an operating handle 50. When this handle is swung, it is effective in moving the toggle links 32 and 33, and accordingly in swinging the bracket 28 from its lowered to its lifted position or vice versa, suitable stop means 52 are provided on the toggle linkage to permit the same to move to a position slightly beyond dead center, thus to assure a firm locking of the parts when filler 26 is raised.

A rubber weather strip 55 may be disposed in a recess on the outer door rail to engage the face of the glass, as shown in Fig. 7, while a similar strip 56 may be disposed upon the inner rail below the rabbeted portion 59 thereof which receives the member 26 in its lowered position. As shown in Fig. 10, the opening 31 is provided by cutting away the edge of the inner door rail; the bracket 28 moves through this opening and the end of member 56 is of special form, as shown particularly in Figs. 4 and 5, providing an enlarged block portion 58 under the portion 30 of the door, thus to afford sealing and cushioning means adjoining this part of the glass. When the member 26 is in its lowered position, it occupies the rabbet 59 (Fig. 16) in the inner door rail with its surface projecting slightly above the remainder of the rail, except an aligned upstanding portion 54, and it covers the opening 31 so that a finished appearance is afforded. When the member 26 is in its operative position, the bracket 28 substantially occupies the opening 31 and the toggle links 32 and 33 are concealed by this bracket.

It is evident that the member 26 may be swung from its lowered to its lifted position or vice versa when either of the panels is raised or lowered or occupying an intermediate position. Thus the movement of the member 26 is quite independent of the positions of the adjoining panels. It is furthermore evident that when the toggles 32 and 33 are properly positioned they serve as a lock firmly to hold the member 26 in its operative position so that pressure upon the outer face of the same may not be effective in causing its downward movement and thus permit possible tampering with the interior of the vehicle if the doors of the same are locked. The rabbet 59 in the inner door rail is so arranged that the inner face of lowered member 26 may engage the inner surface of the panel 6 when the former is lowered.

In general the principles of this invention may be employed with a wide variety of body wall arrangements. Thus the arrangement shown in Figs. 1 and 2 involves a front door 1 and a rear door 2 mounted on a common post 45, the doors having adjoining rabbeted end portions and the post being shaped to extend between these end portions to support common hinges 46, while at the rear part of this body wall the door 2 may have a rabbeted end portion engaging the oppositely rabbeted end portion of the fixed section 3. In the illustrated embodiment of the invention the filler member 26 obviously swings away from the front edge of panel 7 when the door 1 is opened, while the rear edge of panel 7 and filler 26 swing away from the panel 8 when the rear door is opened. Accordingly there is no interference between a filler member and the panels, even when one door or both doors are opened. At the rear of door 2, as shown in Figs. 11 and 12, the door latch handle 49 may be provided with a crank shaft 48 straddling the rear edge of panel 7 and connected to the latch mechanism 47.

If desired, the filler members 26 may be mounted so that they will swing forwardly into the space between the panels rather than rearwardly, but to permit a more pleasing appearance of the body rail and to afford additional weather protection I prefer the arrangement shown.

Fig. 3 diagrammatically illustrates various arranegments which may be employed with a filler strip arrangement of the type illustrated in Fig. 1. Thus, as indicated, the door D may be hinged to a fixed section F and the filler member may be mounted upon either the door or the fixed section, or the door $D^1$ may be hinged at its forward end and carry a filler strip which moves with the door away from the fixed section $S^1$, but, if desired, the arrangement may be reversed and the filler strip mounted on the fixed section $S^1$.

As shown in Fig. 1, the doors 1 and 2 may be hinged to the common post 45 or doors $D^3$ and $D^4$ may both be hinged at their forward edges, the door $D^4$ being hinged to an intermediate post P, this arrangement permitting the arrangement of the filler strip upon the juxtaposed edges of either of the doors $D^3$ or $D^4$.

The exact relative positioning of adjoining panel edges may be somewhat varied without departing from the spirit of this invention. I prefer, as shown, to arrange the adjoining panel edges so that, as viewed from the side of the vehicle wall, they are in slightly overlapped relation, although laterally spaced from each other. Accordingly this invention permits the provision of a closure wall comprising panels having transparent juxtaposed edges under ordinary operating conditions. It is possible, however, to arrange the edges of the panels so that they are slightly spaced longitudinally of the vehicle as well as transversely thereof. In any case, I contemplate arranging these edges so that the rear edge of the front or forward panel affords substantial protection against the entrance of wind and rain between the panels when the car is moving at a normal operating speed. I consider it desirable to arrange the panels so that a line extending from the rear edge of the front panel to the front edge of the rear panel will be disposed at an angle A not greater than about thirty degrees to the longitudinal extent of the vehicle (Figs. 19 and 20).

While I have illustrated this invention as applicable to panels following straight rectilinear paths, I also contemplate its employment with panels moving upwardly along curved paths, such as the panel 3 illustrated in my prior Patent No. 1,826,922, or a panel following a generally inclined path such as illustrated in Fig. 19 of my copending application Serial No. 670,487, filed May 11, 1933.

The vehicle may be provided with a suitable top T having a valance V extending along its side to engage the upper edges of the raised panels. Thus, as shown in Figs. 8 and 13, this valance may have a rib 60 with a downwardly and inwardly inclined face 61 to engage the panel 7, while a gutter 63 integral with the valance may extend along its outer edge. In front of the rib 60 the valance may be provided with a thicker portion 64 having an inclined surface 65 to engage the panel 6. Thus the valance is effective in properly positioning the upper edges of the fully raised panels and is particularly effective in pressing the upper part of panel 7 outwardly so that it is firmly held against the upper part of the member 26 if the latter is raised. The worms 10 may also be arranged so that the normal path of panel 6 has a slight inward inclination in relation to the panel 7 so that these panels, when raised, incline slightly toward each other, and the upper parts of both panels may firmly engage the yieldable member 26 when the latter is also raised. The upper surface of member 26 when raised preferably is inclined upwardly and outwardly, as viewed in Fig. 8, and is adapted to engage the lower portion of the part 64 of the valance, the yieldability of the valance, which conveniently may be formed of rubber, and the yieldability of the upper part of member 26 being effective in causing the close fitting of these parts. It is furthermore evident that the upper end of member 26 as it moves towards its raised position passes beyond a dead center point, i. e., a point where it is at a maximum distance from the axis of pivot pin 35 so that the yieldable valance aids in holding the member 26 in its operative position. At the rear, valance V may provide an inverted channel portion 66 to engage both faces of the upper edge of rear panel 8, since this panel is not mounted on a swinging door.

As shown in Figs. 15, 17, and 18, the same general arrangement as has been described may be employed to permit the swinging of a filler member 126 from a horizontal inoperative position wherein it extends along the top rail 130 to a depending vertical position wherein it is disposed between the edges of adjoining panels. For this purpose the member 126 may be connected to a bracket 128 mounted on a pivot pin 129 carried by the top frame. A toggle linkage comprising toggle links 133 and 134 may be employed to effect the movement of the member 126 and to lock it in its operative position, the arrangement of the parts being of the same general character as described with reference to the embodiment of the invention shown in Figs. 1 to 9 inclusive, a handle 150 being provided to cause movement of the toggle linkage in the desired manner.

It is obvious that this arrangement permits the downward swinging of the filler member 126 between the edges of the adjoining panels when the latter are in any of their fully or partially raised positions. In other words, the manipulation of the member 126 may be effected quite irrespective of the position of the adjoining panels. This arrangement is particularly suitable when one of the body wall sections is fixed.

Figs. 21 to 25 illustrate a modified embodiment of the invention wherein a flexible filler strip 226 may be employed to occupy the space between adjoining panels 206 and 207. For this purpose an arrangement of the general character disclosed in my copending application Serial No. 370,393 may be employed, such an arrangement being characterized by a tubular guide 210 within the top; the member 226, which conveniently may be formed of rubber or other yieldable resilient material, having its upper or inner end connected by a coil spring 211 to a fixed block 212 in the intermediate part of the guide member 210. The lower end of guide member 210 extends through an opening in the valance 205 and carries a handle or finger piece 214 of sheet metal which engages the lower surface of a part of this valance to act as a stop. The member 226 thus, in this position of the parts, projects slightly into the space between adjoining panels even when in its inoperative position. When the member 226 is moved to its operative position, the handle 214 is engaged by the hand of the user and the strip is drawn downwardly against the tension of spring 211. Extension 219 of the handle passes through an opening 220 in the upper part of the body wall and engages a latch 221 which locks the member 226 in its operative position. A latch handle 222 is provided to permit releasing of the latch and upward movement of the member 226 under the action of spring 211. Obviously the member 226 is adapted to twist to conform to the swinging movement of a door, if it is connected to a swinging door rather than to a fixed wall section.

It is evident that the present invention permits a simple arrangement of the closure panels so that the same may be firmly and securely mounted on the body wall sections and so that they need only follow rectilinear paths. Under most operating conditions, therefore, it is only necessary to manipulate the panels in the conventional manner to afford the desired adjustment of the same. Under certain conditions, as when the temperature is high and it is rainy, the spaces between the panels, particularly if front ventilators are open, may be effective in permitting circulation of air while still affording satisfactory weather protection. Under occasionally severe weather conditions, the filler members may be readily actuated entirely to close the spaces between the panels, or these filler members may be actuated when it is desired to leave the vehicle in a completely locked condition. The arrangement of the filler members so that they move in the general plane of the body wall quite independently of the position of the panels and without necessity for opening doors permits a very simple and convenient manipulating arrangement. Obviously the structure of the filler members themselves is very simple. The self-locking arrangement for operating the filler members is advantageous in firmly bracing them in their operative positions to guard the vehicle, when locked, against unauthorized tampering.

It is evident, therefore, that the present invention affords a closure wall arrangement which, for average operating conditions, permits the full advantages of a completely transparent wall comprising easily movable panels, and avoids any necessity of contact between the panels and danger of rattling and necessity of special precaution against the same, but that when it is necessary to move the filler members, this operation can be performed with great facility.

I claim:

1. A vehicle body comprising a body wall including adjoining sections having pockets therein, panels movable upwardly out of the respective sections to a raised position thereabove, said panels in their raised positions having juxtaposed adjoining edges spaced laterally from each other, and a filler strip movable independently of the panels and irrespective of the positioning thereof into the space between the adjoining panel edges, said filler strip being movable in the plane of the body wall.

2. A vehicle body comprising a body wall including adjoining sections having pockets therein, panels movable upwardly out of the respective sections to a raised position thereabove, said panels in their raised positions having juxtaposed edges spaced laterally from each other, and a filler strip movable independently of the panels and irrespective of the positioning thereof into the space between the adjoining panel edges, said filler strip being pivotally mounted on the body wall and swingable from a position wherein it lies substantially horizontal to a position between the panels.

3. A vehicle body including a top providing a side wall and a body wall having sections with pockets therein, window panels movable upwardly out of said pockets to raised positions thereabove wherein juxtaposed edges of the panels are spaced laterally of the body wall from each other, and a filler strip swinging from a position wherein it is disposed substantially horizontally along the edge of one of said walls to a vertical position between the adjoining edges of said panels.

4. A vehicle body including a top providing a side wall and a body wall having sections with pockets therein, window panels movable upwardly out of said pockets to raised positions thereabove wherein juxtaposed edges of the panels are spaced laterally of the body wall from each other, a filler strip swinging from a position wherein it is disposed substantially horizontally along the edge of one of said walls to a vertical position between the adjoining edges of said panels, and toggle mechanism associated with said filler member and effective to brace and lock it in its operative position.

5. A vehicle body including a top providing a side wall and a body wall having sections with pockets therein, panels movable upwardly out of said pockets to raised positions thereabove wherein the adjoining edges of the panels are spaced laterally from each other, a filler member swinging from a position wherein it is disposed substantially horizontally along the edge of one of said walls to a vertical position between the adjoining edges of said panels, toggle mechanism associated with said filler member and effective to brace and lock it in its operative position, and a handle accessible from the interior of the vehicle and connected to said toggle mechanism to effect the swinging movement of the filler member in either direction.

6. A vehicle body including a top providing a side wall and a body wall having sections with pockets therein, panels movable upwardly out of said pockets to raised positions thereabove wherein juxtaposed edges of the panels are spaced laterally from each other, a filler member swinging from a position wherein it is disposed substantially horizontally along the edge of one of said walls to a vertical position between the adjoining edges of said panels, and self-locking means accessible from the interior of the body to swing the filler member to its operative position and retain it therein.

7. In a vehicle body, a body wall having adjoining sections with panels thereon, one of said sections being a door, a filler panel pivotally mounted on the door and swingable about a pivotal mounting from an inoperative position adjoining the upper part of the door to a vertical operative position between the panel edges, a swinging bracket associated with said filler member and connected to the pivotal mounting, and an opening in the upper part of the door through which the bracket moves, said bracket substantially filling said opening when the filler member is in its raised position, the filler member substantially concealing said bracket when it is in its lowered position.

8. A vehicle body comprising a body wall including adjoining sections with panels thereon having their edges laterally spaced from each other, a top above the body wall having a side wall, a filler member movable from a substantially horizontal position adjoining the edge of one of said walls to a vertical position between the adjoining panel edges, and a pivotal mounting for said filler member including a bracket, and toggle means connected to the end of the filler member and concealed by said bracket when the filler member in operative position.

9. A vehicle body comprising a body wall including adjoining sections having pockets therein, a top above the body wall, a valance extending along the lower edge of the top, a swinging member pivotally mounted on the body wall and movable from a substantially horizontal position within the wall to a substantially vertical raised position thereabove, and a pivotal mounting for said member being arranged so that its upper end moves downwardly slightly as the member passes into its raised position, the upper end of the member moving into engagement with the valance and compressing the material thereof during this portion of its path.

10. A vehicle body comprising a body wall having adjoining sections therein, one of said sections being a door, said sections having adjoining ends with complementary rabbets thereon, panels carried by the respective sections and having end portions projecting over parts of said rabbets, and a filler member movable substantially in the plane of the body wall from an inoperative position to a position wherein it is positioned between adjoining inner and outer faces of the panels.

11. A vehicle body comprising a body wall having pockets therein, panels movable upwardly out of substantially concealed positions within the wall to raised positions thereabove, said panels being laterally inclined in relation to each other throughout their paths, and a top providing a valance above the body wall, said valance having offset downwardly protuberant portions to engage the adjoining ends of the upper edges of said panels.

12. A vehicle body comprising a body wall including adjoining sections, one of said sections being a door having a free end engageable with the other section, said free end of the door and the adjoining end of said other section being provided with complementary rabbets, a panel mounted on the door and movable from a concealed position within the door to a raised position, a door latch disposed on the door inwardly of the panel, and an exterior handle mounted on the outer portion of the door to operate said latch, and a connection between the handle and the latch, said connection having a part at the outer end of the door extending past the end of the panel and then extending inwardly adjoining the inner face of the panel and between the same and the generally longitudinally disposed face of the rabbeted portion of the door.

13. A vehicle body comprising a body wall including a door section and an adjoining section, panels mounted on the respective sections and having adjoining parallel edges in substantially spaced overlapping relation, and a filler strip of generally rectangular cross section movable into the space between the panels.

14. A vehicle body comprising a body wall including a door section and an adjoining section, panels movable out of pockets in the respective sections to raised position thereabove where they have adjoining parallel edges in substantially spaced overlapping relation, and a filler strip of generally rectangular cross section movable into the space between the panels.

15. A vehicle body comprising a body wall including a door section and an adjoining section, panels mounted on the respective sections and having adjoining parallel edges in substantially spaced overlapping relation, and a filler strip having a rigid core and a jacket of distortable material, said strip being movable into the space between the panels.

16. A vehicle body comprising a body wall, a front panel and an adjoining panel both carried by the body wall and each movable along generally vertical paths from a concealed position in the body wall to a raised position thereabove, and lifting and guiding means for the panels, the panels being arranged so that the front panel is laterally inclined in relation to the rear panel throughout the major portion of its path to raised position so that the rear edge of the front panel is spaced outwardly in a transverse direction in relation to the front edge of the rear panel when the rear panel is raised and the front panel is partially or fully raised, these edges of the panels being so arranged as to afford protection against the entrance of rain between the panel edges when both panels are raised and the vehicle is moving at a normal operating speed.

17. A vehicle body comprising a body wall, a front panel and an adjoining panel both carried by the body wall and each movable along generally vertical paths from a concealed position in the body wall to a raised position thereabove, and lifting and guiding means for the panels, the panels being arranged so that the front panel is laterally inclined in relation to the rear panel throughout the major portion of its path to raised position so that the rear edge of the front panel is spaced outwardly in a transverse direction in relation to the front edge of the rear panel when the rear panel is raised and the front panel is partially or fully raised, these edges of the panels being so arranged as to afford protection against the entrance of rain between the panel edges when both panels are raised and the vehicle is moving at a normal operating speed, and filler means movable into the space between the panels to cooperate therewith in affording a weather-tight closure when desired.

18. A vehicle body comprising a hollow body wall, window panels movable outwardly out of substantially concealed positions within the wall to raised positions thereabove, said panels being laterally inclined in relation to each other so that their adjoining edges are spaced transversely from each other when they attain their fully raised positions, and a top providing a valance above the body wall, said valance having offset downwardly protuberant projections to engage the adjoining ends of the upper edges of said panels when they are thus laterally spaced from each other.

19. A vehicle body comprising a body wall including two swinging doors, a post between the doors, said doors having adjoining ends oppositely rabbeted, the post having a part extending outwardly to define a hinge axis adjoining the outer face of the body wall, said part having a substantially L-shaped cross section and lying between the rabbeted ends of the doors, and panels carried by the doors and having ends extending into the rabbeted ends of the doors, said ends of the panels thus being supported in spaced overlapping relationship.

20. A vehicle body comprising a body wall, a front panel and an adjoining panel both carried by the body wall and each movable along generally vertical paths from a concealed position in the body wall to a raised position thereabove, said panels having adjoining transparent edges, and lifting and guiding means for the panels, the panels being arranged so that the front panel is laterally inclined in relation to the rear panel throughout the major portion of its path to raised position so that the rear edge of the front panel is spaced outwardly in spaced overlapping relation to the front edge of the rear panel when the rear panel is raised and the front panel is partially or fully raised, these edges of the panels being so arranged as to afford protection against the entrance of rain between the panel edges when both panels are raised and the vehicle is moving at a normal operating speed.

21. A vehicle body comprising a body wall, a movable front panel and second movable panel both carried by the body wall, said body wall providing a pocket, the second panel being movable along a generally vertical path from a concealed position in the pocket to a raised position thereabove, said panels having adjoining glass edges, and lifting and guiding means for the second panel, the panels being movable so that the front panel may have its glass edge in generally spaced overlapping relation to the front edge of the partially or fully raised second panel, and a swinging filler strip movable in the general plane of the panels from a substantially horizontal inoperative position to an operative position wherein it is disposed between the adjoining panel edges to close the space therebetween, said strip being movable in either direction between operative and inoperative positions irrespective of the positioning of the panels, said panels being movable irrespective of the positioning of said strip.

RAYMOND L. CARR.